United States Patent [19]
Mehring

[11] 3,786,846
[45] Jan. 22, 1974

[54] SHIELD ASSEMBLY FOR ROUTER

[75] Inventor: Lucien L. Mehring, Morton Grove, Ill.

[73] Assignee: Danley Machine Corporation, Chicago, Ill.

[22] Filed: Oct. 17, 1972

[21] Appl. No.: 298,414

[52] U.S. Cl......... 144/251, 29/DIG. 59, 29/DIG. 86, 51/273, 83/100, 83/397.1, 144/252
[51] Int. Cl............................................. B27g 21/00
[58] Field of Search. 29/DIG. 50, DIG. 58, DIG. 59, 29/DIG. 84, DIG. 86; 83/98, 100, 397.1, 397; 144/251, 252; 51/273

[56] References Cited
UNITED STATES PATENTS

| | | | |
|---|---|---|---|
| 3,167,260 | 1/1965 | Gibbons et al. | 144/252 R |
| 2,944,465 | 7/1960 | Jones | 144/252 R |
| 2,354,291 | 7/1944 | Grover | 83/397 X |
| 2,516,840 | 8/1950 | Allen, Jr. et al. | 29/DIG. 86 |
| 2,183,262 | 12/1939 | Kelley | 29/DIG. 86 |
| 1,823,375 | 9/1931 | Potter et al. | 29/DIG. 59 |

Primary Examiner—Andrew R. Juhasz
Assistant Examiner—W. D. Bray
Attorney, Agent, or Firm—Wolfe, Hubbard, Leydig, Voit & Osann, Ltd.

[57] ABSTRACT

A shield assembly for a router which is made up of two relatively telescoping sections, with the upper section being secured to the headstock and the lower section being coupled to the spindle carrier so that it moves with the tool. To couple the lower section to the spindle carrier a ledge member is adjustably secured between them. The sections are biased together with interposed stops so that the lower section occupies a reference position but is engaged by the spindle carrier when the latter moves downwardly toward the work. The lower section is provided with a window of transparent material for viewing the field of operation of the tool. The lower section is also provided with an encircling brush which yields as the tool is fed axially into engagement with the work. Finally, the lower section has provision for evacuation with ambient air being drawn through the bristles of the brush for continuous clearing away of chips.

7 Claims, 4 Drawing Figures

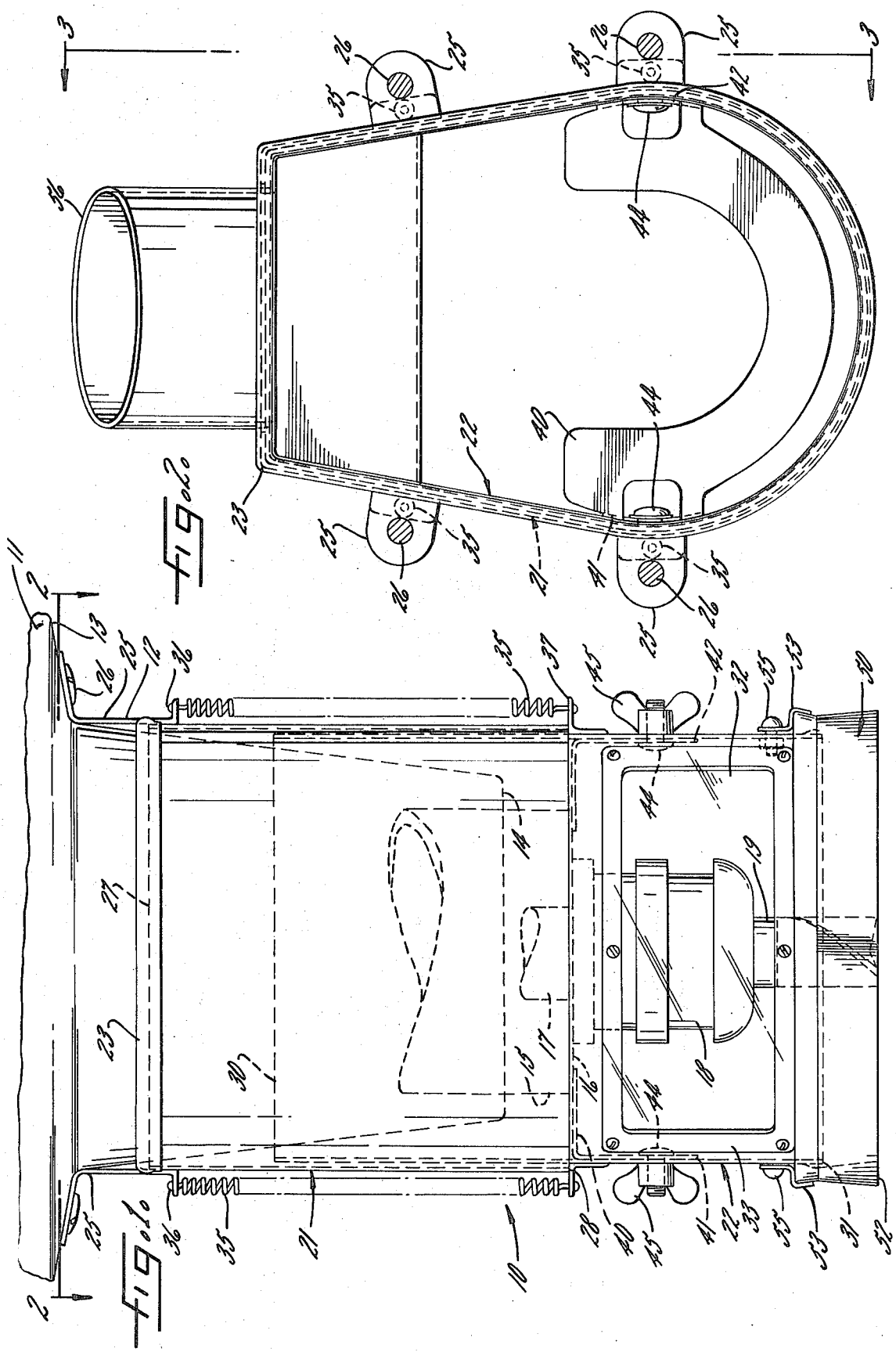

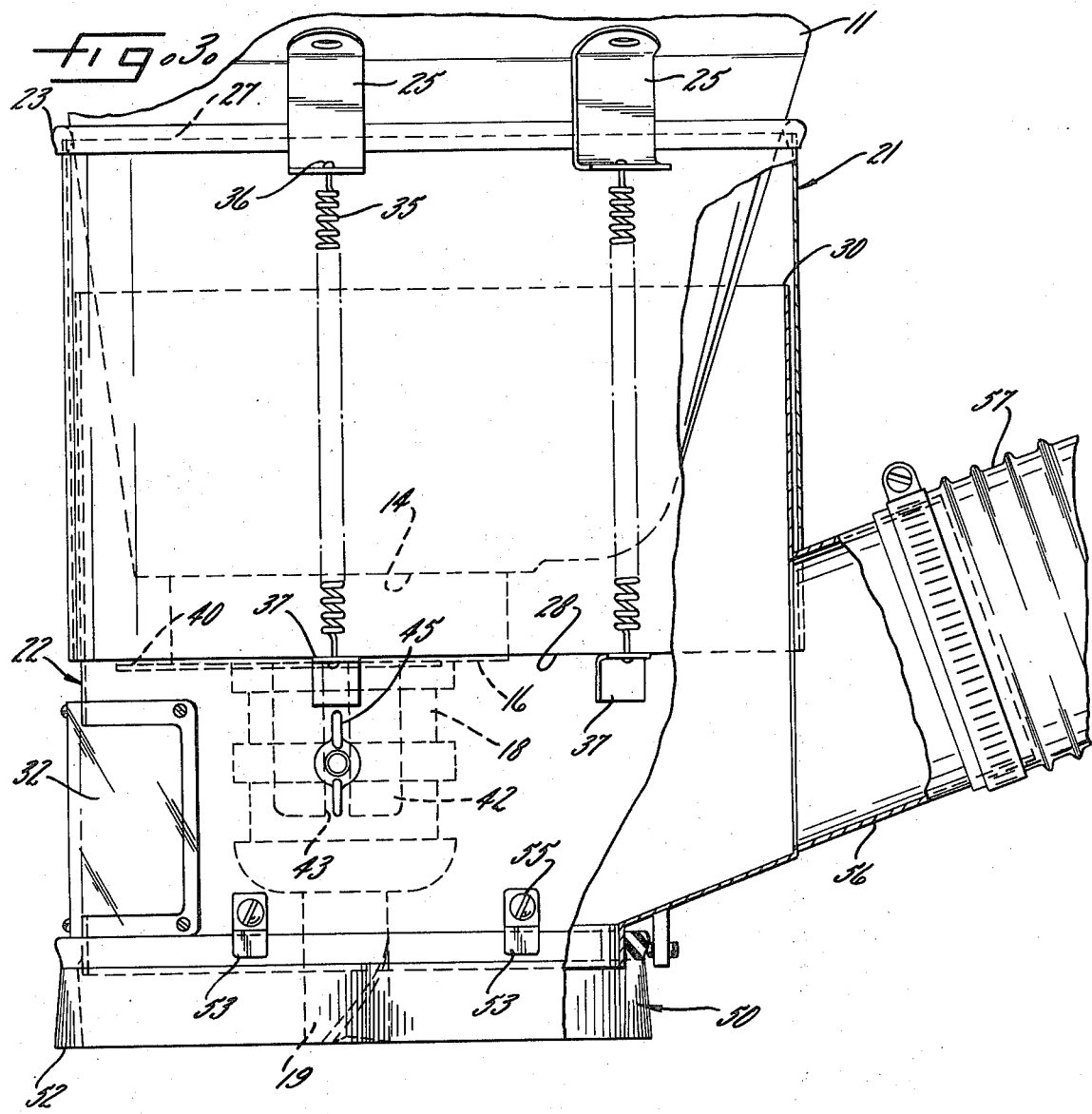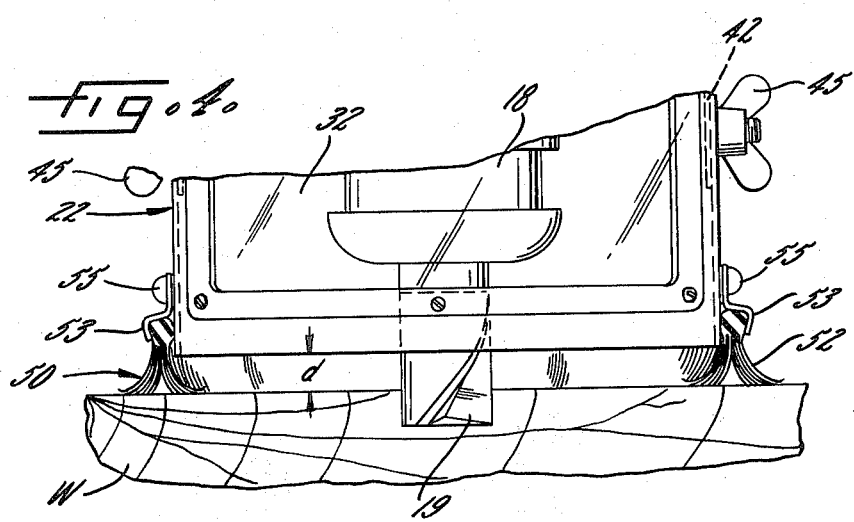

SHIELD ASSEMBLY FOR ROUTER

It is an object of the present invention to provide a shield assembly for a router which provides a high degree of safety, keeping the router tool encircled in all positions and enclosed so that, at the normally high router speeds, a chip does not become a dangerous missile. It is another object of the present invention to provide a shield assembly for a router which may be easily secured to the machine and which may be used on machines of different design with little or no modification.

It is a more specific object of the present invention to provide a shield assembly for router which consists of relatively telescoping sections which are biased together with the lower section being so related to the spindle carrier that the tool never projects beyond the confines of the lower section while, nevertheless, permitting the relative accommodation necessary to permit the tool to axially enter the work. It is a related object of the invention to provide a shield assembly for a router in which the same degree of protection is achieved for routing tools having different effective lengths.

It is yet another object of the present invention to provide a shield assembly for a router in which the assembly is evacuated for chip removal and in which the lower section of the assembly terminates in a brush, with incoming air being admitted through openings in the brush so as to sweep the field constantly clear of chips.

Other objects and advantages of the invention will become apparent upon reading the attached detailed description and upon reference to the drawings in which:

FIG. 1 is an elevational view showing a shield assembly constructed in accordance with the present invention as applied to a typical design of router.

FIG. 2 is a top view of the shield assembly looking along the line 2—2 in FIG. 1.

FIG. 3 is a side elevation of the shield assembly with a portion broken away.

FIG. 4 is a fragmentary front elevation showing the yielding of the brush which accompanies axial feed of the tool into the workpiece.

While the invention has been described in connection with a preferred embodiment, it will be understood that I do not intend to be limited to the particular embodiment shown but intend, on the contrary, to cover the various alternative and equivalent constructions included within the spirit and scope of the appended claims.

Turning now to the drawings, there is shown at 10 a shield assembly constructed in accordance with the invention secured to a headstock 11 of a typical routing machine, the head-stock having a downwardly projecting portion with a side wall 12 as well as an adjacent surface 13 which is generally horizontal or angled as shown. Means, not shown, are normally provided for securing movement of the headstock 11 with two horizontal components. Projecting from the lower end 14 of the headstock is a spindle carrier 15 which is of cylindrical shape and which has provision, not shown, for axial movement with respect to the headstock. The lower edge of the spindle carrier, indicated at 16, is commonly referred to as the "spindle nose." Mounted in the spindle carrier in suitable anti-friction bearings is the spindle 17 which carries a chuck 18 in which is mounted a routing tool 19. The spindle 17 is coupled to a suitable source of rotative power and, when cutting wood or other non-metallic materials or aluminum, or other soft metals, operates at speeds on the order of 10,000 r.p.m. Because of such operating speeds operating speeds the tool and the chips produced by the tool constitute a hazard to the workman attending the machine. Moreover, chips are produced at such a high rate as to interfere with visibility and control of the tool.

In accordance with the present invention a shield assembly is provided having a generally tubular upper section which is anchored to the headstock in confining relation and with a cooperating generally tubular lower section of conforming size so that the two sections together define an enclosure surrounding the tool, means being provided for coupling together the spindle carrier and the lower section so that the enclosure is automatically extended to follow the axial movements of the tool and with a resilient element being provided along the lower edge of the lower section arranged to yield upon engagement with the workpiece as the tool enters the workpiece. The enclosure thus formed is constantly evacuated by connection to a source of vacuum and means are provided for confining the entering air to the area around the tool so that such area tends to remain clear of chips. A window of transparent material in the lower section permits continuous observation and monitoring of the progress of the tool.

Thus, referring to the preferred embodiment, the shield assembly includes an outer tubular element 21 within which is telescoped a conforming inner tubular element 22, with the clearance in between being limited to provide free sliding movement. The upper and lower sections, while tubular are, in the present instance, non-circular, being generally of "D" shape so as to conform to the wall 12 of the headstock, with the upper edge being sealed to the latter by a suitable gasket 23. For mounting the upper section to the headstock, a set of four mounting brackets 25 are provided (see FIG. 2) having outwardly bent tab portions which are secured to the surface 13 by machine screws 26. The lower or shank portions of the brackets 25 may be spot welded or otherwise suitably secured to the upper edge 27 of the shield section 21. The section terminates in a lower edge indicated at 28.

Turning attention to the lower section 22, it includes an upper edge 30 and lower edge 31. The lower section includes a window 32 made of transparent material suitably held in place by a frame 33 so that the tool and the presented area of the workpiece W (see FIG. 4) are in the field of vision.

Means are provided for biasing the lower section 21 upwardly into a reference position. The biasing means includes a series of springs 35, the upper ends 36 of which are anchored to the respective mounting brackets 25 and the lower ends of which are secured to stop members 37 in the form of small angles which are spot welded or otherwise secured to the wall of the lower section. The reference postion of the two telescoping pieces is determined by the bottoming of the stop members 37 against the edge 28.

Mounted within the lower section 22 and in the path of movement of the spindle nose 16 is a ledge 40 of horseshoe shape. Such ledge is positioned, taking the length of the tool 19 into account, so that the cutting edges of the tool are substantially flush with the lower edge of the enclosure as illustrated in FIGS. 1 and 3. In order to adjust the position of the ledge to accomodate tools of different lengths, the ledge 40 has a pair of integral mounting tabs 41, 42 which are slotted as indicated at 43 (FIG. 3) and which are respectively secured by mounting screws 44 fitted with wing nuts 45. To adjust the ledge height it is a simple matter to loosen the nuts 45 with the working end of the tool in the "flush" condition illustrated in FIG. 1, the ledge member 40 then being pushed up into bottomed engagement with the spindle nose 16, following which the wing nuts may be tightened.

In accordance with one of the important aspects of the present invention the lower shield section 22 has a resilient skirt element fitted to its lower edge which is arranged to yield as the assembly is brought into engagement with the surface of a workpiece so as to permit the routing tool to enter the workpiece, the enclosure being evacuated and the resilient element being preferably of porous construction so as to confine entry of air to the area of the workpiece which surrounds the tool to keep such area clear of chips.

In the present embodiment the resilient work-engaging skirt is in the form of a brush 50 having a backing 51 and set of downwardly extending bristles 52, the backing being made of thin metal or the like as to be bendable to conform to the lower edge 31 of the shield section and secured to the lower edge by means of clips 53 held in position by machine screw 54. To evacuate the enclosure a vacuum connection 56 is provided at the rear of the lower section 22 connected by a flexible conduit 57 to any suitable vacuum-inducing means having provision for collection and disposal of the evacuated chips.

The tubular sections of the shield are fitted sufficiently close together and the upper section is sufficiently gasketed to the headstock so that air is drawn into the enclosure primarily through the spaces between the bristles 52 of the brush, resulting in an inwardly sweeping blast which acts radially inward at the region of tool engagement so that the chips of wood, non-ferrous metal or the like are continually swept clear of the workpiece and withdrawn through the conduit 56, so that the field of workpiece and tool continue to be clearly visible through the window.

With the shielding arrangement adjusted as shown in FIG. 1, the spindle carrier, chuck and tool may occupy a normal position above that shown, that is, with clearance space below the spindle nose 16. However, when the spindle carrier is advanced downwardly toward the work, the spindle nose 16 "picks up" the ledge member 40 so that any further movement of the tool toward the work is accompanied by downward movement of the lower section 22, thus effectively elongating the enclosure. As the bristles strike the workpiece upon entry of the tool they yield as shown in FIG. 4, the degree of yielding depending upon the depth of the tool in the work. The yielding of the bristles reduces the clearance between the lower edge 31 of the section 22 and the workpiece to a relatively narrow distance $d$ so that the incoming air stream through the bristles is highly concentrated along the surface of the workpiece and, therefore, at a high inrush velocity, a velocity which is sufficient to sweep the area surrounding the tool constantly clear of chips. The brush, being removable, may be replaced by one having longer bristles where greater penetration is required.

The invention has been described in connection with a bristle brush as a preferred embodiment since yielding of the bristles does not produce excessive throttling of the air. It will be understood, however, that the invention in its broader aspects is not limited thereto and that any porous resilient element, capable of yielding upon engagement with the surface of the workpiece may be employed. Indeed, it is possible to employ a yielding element which is non-porous as long as equivalent ports for inlet air are provided along the lower edge 31.

Moreover, while the preferred form of the invention employs relatively telescoping and closely fitted tubular sections, the invention is not necessarily limited thereto and a tubular bellows, connected along its lower edge to the lower section, may be substituted for the upper section 21. In either event the lower section will be provided with a ledge member 40 for engagement by the spindle carrier 15 thereby to maintain a constant relationship between the enclosure and the tool as the tool is lowered into engagement with the work.

The shield assembly discussed above may be either permanently attached to the routing machine or may be easily removable. For more permanent attachment the brackets 25 may be permanently secured to the upper section 21 so that unscrewing of the machine screws 26 would be necessary to remove the assembly. However, if desired, the brackets 25 need not be permanently attached to the upper section but may be frictionally engaged with it, thereby permitting removal of the assembly simply by unstepping the upper ends of the springs from the brackets, leaving the brackets permanently attached.

The simplicity of construction and mounting of the shield assembly makes it a simple mater to install shield assemblies of the present design in the field upon a wide variety of routing machines. Indeed, the assembly need not be conformed to the cross section shape of the headstock and the gasket 23 may be sized to fill the gap between the assembly and the wall of the headstock so as to prevent entry of air in this region. Also the ledge member 40 may be replaced by one which is suitably dimensioned so as to lie in the path of movement of the spindle carrier regardless of the radial dimension of the spindle carrier.

While the invention has been described in connection with a routing machine in which the tool is moved along one or both of the horizontal axes, it will be apparent that the advantages of the shield assembly may be achieved in various types of routing machines where there is not provision for horizontal movement and where the axis is horizontal the axis is horizontally fixed as in the case of a drill press.

The invention has been described with the routing tool 19 in the normal vertical orientation, but it will be understood that the vertical orientation is not essential and that the terms "up" and "down" as used herein are relative terms indicating oppositeness of direction.

What I claim is:

1. A shield assembly for a router having a headstock and spindle carrier mounting a spindle and chuck with a routing tool therein, the combination comprising a generally tubular upper section, means for anchoring the upper section to the headstock in confining relation, a generally tubular lower section conformingly telescoped with respect to the upper section to define an enclosure surrounding the tool, means for coupling together the spindle carrier and the lower section so that the lower section moves upwardly and downwardly with the spindle carrier with the result that the enclosure not only surrounds the tool but extends to follow the axial movements of the tool, means for continuously evacuating the enclosure, and a brush along the lower edge of the lower section with bristles extending downwardly as a skirt therefrom so that as the spindle carrier is advanced to bring the tool into engagement with the workpiece the bristles yield, with the spaces between the bristles serving to admit air to the chamber thereby tending to maintain the area surrounding the tool clear of chips.

2. A shield assembly for a router having a headstock and spindle carrier mounting a spindle and chuck with a routing tool therein, the combination comprising a generally tubular upper section, means for anchoring the upper section to the headstock in confining relation, a generally tubular lower section which serves with the upper section to define an enclosure surrounding the tool, the lower section being relatively movable with respect to the upper section, means for coupling the lower section to the spindle carrier so that the lower section moves upwardly and downwardly therewith with the result that the enclosure not only surrounds the tool but extends to follow the axial movements of the tool as it moves into engagement with a workpiece, means for continuously evacuating the enclosure, and a porous resilient skirt element mounted along the lower edge of the lower section and extending downwardly therefrom so that as the spindle carrier is advanced to bring the tool into engagement with the workpiece the element yields while serving to admit air to the evacuated chamber thereby tending to maintain the area surrounding the tool clear of chips.

3. A shield assembly for a router having a headstock and spindle carrier mounting a spindle and chuck with a routing tool therein, the combination comprising a generally tubular upper section, means for anchoring the upper section to the headstock in confining relation, a generally tubular lower section conformingly telescoped with respect to the upper section to define an enclosure surrounding the tool, a set of springs and stops for biasing the lower section upwardly into a stopped reference postion, a ledge on the lower section arranged in the axial path of movement of the spindle carrier so that as the spindle carrier is advanced toward the work the enclosure is extended to follow the axial movement of the tool, means for continuously evacuating the enclosure, and a porous resilient skirt element arranged along the lower edge of the lower section and extending downwardly therefrom so that as the tool and lower section are advanced the resilient element yields upon engagement with the workpiece while admitting air to the chamber thereby tending to maintain the area surrounding the tool clear of chips, the upper section being closely fitted to the headstock and the sections being closely fitted to one another so that the air which enters the enclosure is primarily that which passes through the porous resilient element adjacent the surface of the workpiece.

4. The combination as claimed in claim 3 in which the lower tubular section is fitted with a window of transparent material for viewing the area surrounding the tool thereby to monitor the movement of the tool with respect to the workpiece.

5. A shield assembly for a router having headstock and spindle carrier mounting a spindle and chuck with a routing tool therein, the combination comprising a generally tubular upper section, means for anchoring the upper section to the headstock in confining relation, a generally tubular lower section which is movable with respect to the upper section and which with the upper section defines an enclosure surrounding the tool, means biasing the lower section upwardly to a reference position, a ledge member mounted within the lower section and arranged in the path of movement of the spindle carrier so that as the spindle carrier is moved downwardly to feed the tool into engagement with the workpiece the lower section moves downwardly with the tool, the ledge member being adjustable in the axial direction with respect to the lower section so that the lower section may accommodate tools of different axial lengths, means for continuously evacuating the enclosure, a resilient skirt element along the lower edge of the lower section for yielding upon engagement with the workpiece as the tool is advanced into engagement with the workpiece, and means for admitting air to the enclosure at the area of the workpiece which surrounds the tool thereby tending to maintain such area clear of chips.

6. The combination as claimed in claim 5 in which the ledge member is of horseshoe shape.

7. The combination as claimed in claim 1 in which the brush has a bendable longitudinal backing which is bent to conform to the shape of the lower section and which is removably clamped in place thereon to permit substitution of brushes having different bristle lengths depending upon the desired degree of insertion of the tool into the workpiece.

* * * * *